United States Patent [19]

Eberle et al.

[11] Patent Number: 4,853,017

[45] Date of Patent: Aug. 1, 1989

[54] METHOD AND APPARATUS FOR THE ENVIRONMENTAL CONTROL OF FIBER FORMING ENVIRONMENT

[75] Inventors: Douglas J. Eberle, West Bloomfield, Mich.; Scott R. Northrup, Pickerington, Ohio

[73] Assignee: Owens-Corning Fiberglas Corporation, Toledo, Ohio

[21] Appl. No.: 292,592

[22] Filed: Dec. 30, 1988

Related U.S. Application Data

[63] Continuation of Ser. No. 129,265, Dec. 7, 1987, abandoned.

[51] Int. Cl.$^4$ .................. C03B 40/04; C03B 37/012
[52] U.S. Cl. .............................. 65/2; 65/1; 65/12
[58] Field of Search .................. 65/1, 2, 12, 6, 16

[56] References Cited

U.S. PATENT DOCUMENTS

| | | | |
|---|---|---|---|
| 3,304,163 | 2/1967 | Holschlag | 65/12 X |
| 3,558,293 | 1/1971 | Zurheide | 65/2 |
| 3,697,241 | 10/1972 | Strickland et al. | 65/2 |
| 3,969,099 | 7/1976 | Reese | 65/1 |
| 4,049,411 | 9/1977 | Long et al. | 65/2 |
| 4,049,412 | 9/1977 | Dent et al. | 65/2 |
| 4,049,415 | 9/1977 | Dent | 65/11.1 |
| 4,058,385 | 11/1977 | Kleist | 65/12 X |
| 4,088,469 | 5/1978 | Schaefer | 65/5 |
| 4,118,210 | 10/1978 | Watanabe et al. | 65/2 |
| 4,146,377 | 3/1979 | Bour | 65/4.4 |
| 4,300,929 | 11/1981 | Carruth et al. | 65/12 X |
| 4,676,813 | 6/1987 | Hanna et al. | 65/2 |

OTHER PUBLICATIONS

"Air Quenching of Melt-Spun Filaments" Fiber World 9/1984, pp. 78–83 Franz Fourne.

*Primary Examiner*—Robert L. Lindsay
*Attorney, Agent, or Firm*—Patrick P. Pacella; James F. Porcello

[57] ABSTRACT

The present invention relates to an improved method and apparatus for controlling the air quality in the fiber forming zone of glass fiber manufacturing operation. The present invention provides a housing extending from the bushing to the applicator roller, the housing intended to prevent the recirculation of air containing contaminated particulate into the fiber forming zone. Clean air is supplied with the housing at desired flow rates to maintain temperature and air flow requirements.

10 Claims, 5 Drawing Sheets

METHOD AND APPARATUS FOR THE ENVIRONMENTAL CONTROL OF FIBER FORMING ENVIRONMENT

This is a continuation, of application Ser. No. 129,265, filed 12/7/87, now abandoned.

BACKGROUND OF THE INVENTION

The present invention relates an improved method and apparatus for controlling the air quality in the fiber forming zone of glass fiber manufacturing operations. The process of glass fiber forming is regularly plagued by the catastrophic breaking of the glass fiber filaments between the bushing of a glass melt furnace and the applicator which supplies a binder and/or size to the filaments. It is well known that a large percentage of all filament breakage occurs in the fiber forming zone. If the production of clear and cordy beads are included in the count, then approximately one-half of all process failures occur between the bushing and the applicator. Identifiable stones are the cause of approximately one-fourth of the total breaks and mechanical and people caused breaks produce the last one-fourth. Past efforts to reduce breakage have emphasized causes and cures to effect a reduction in the identifiable stones and mechanical and people caused breaks. The present invention emphasizes conditioning of the fiber forming environment to reduce the incidence of filament breakage in the zone between the bushing and the applicator.

A large number of variables are present in the fiber forming process which tend to create a condition that encourages catastrophic filament breakage in the fiber forming zone. A partial listing of such process variables includes bad binder mixes, rough aprons, unacceptable fan tension, alignment problems in the fiber forming apparatus, thermal irregularities, air balance problems, prepad spray imbalances, and temperature and humidity imbalances. A great deal of attention has been paid to the control of temperature and humidity of the fiber forming environment. For instance, the Bour patent, U.S. Pat. No. 4,146,377 has identified non-uniform thermal conditions in the fiber forming environment as a cause for filament breakage. Bour states that changes in the velocity or air temperature near the molten streams of glass can change the viscosity and tension of the streams sufficiently to break the filaments. Bour states that if the air flow in the fiber forming zone is erratic in either velocity or temperature, filament breakage will occur due to the changes in air velocity and/or air temperature. As a result, Bour developed a method for eliminating such erratic air flow and air temperatures immediately below the bushing tips and providing more uniform air flow and air temperatures in the fiber forming zone.

The intrusion of high particulate fluxes into the fiber forming zone has also been identified as another primary cause of increased break performance and surface flaws in the forming glass fiber filament. Air-borne particulate in the fiber forming zone, such as fly and fuzz, can have a catastrophic effect on the formation of the glass fiber filaments. The effects of such air-borne particulate is sensitive to the flux of the particulate which is defined in terms of the number of particles passing through a unit area in a given unit time. Flux determines, when viewed in light of the number and surface area of the forming cones in a given fiber forming tunnel, the probability that a collision between the filaments and the air-borne particulate will take place. Since the particulate is air-borne, its velocity is determined by the air being pulled into each fiber forming zone contained in the forming tunnel.

The size distribution and chemical nature of the particulate depends primarily upon the source of the particulate. Common sources of air-borne particulate which have a deleterious effect on fiber forming are: fly (broken glass filaments) from forming breaks and fabrication operations, $Ti_2$ from gelcoat production, sodium iron laden sized droplets, cement dust from tunnel forming floors, soil dust and batch dust. The concentration of such air-borne particulate in the fiber forming environment is further effected by the activities related to various outside sources and by the effectiveness with which particulate removal occurs prior to outside air becoming tunnel air. In the past, efforts have been directed to eliminate the outside particulate flux by filtering tunnel air and utilizing air conditioned or HVAC air directed at the bushing in the fiber forming zone. Such efforts have not resulted in completely successful results.

It is an object of the present invention to provide an improved method and apparatus for controlling the fiber forming environment in a glass fiber forming operation.

SUMMARY OF THE INVENTION

The present invention provides a method and apparatus for removing airborne particulate in the fiber forming zone of a glass fiber manufacturing process. The manufacturing process for which the method and apparatus of the present invention is intended can be either the continuous strand or wet chop manufacturing process. The apparatus of the present invention provides a unique enclosure for use around each individual fiber forming station in a forming tunnel. The enclosure is designed to ensure that the bushing is supplied with a predetermined volume of clean air. The enclosure of the present invention further provides the isolation of the fiber forming environment from air flow interactions with adjacent positions. Located within each enclosure proximate the bushing tip plate are air supply ducts which supply clean, room temperature or conditioned air to the bushing zone. The input of clean air is the sole supply of air to the fiber forming zone, thereby eliminating particulate contamination in the fiber forming environment.

A second embodiment of the present invention further envisions the use of rear prepad sprays, in conjunction with a modified enclosure around the fiber forming zone. This second embodiment achieves the objectives of eliminating the upward circulation of contaminated air into the forming zone.

Applicants' invention eliminates the unwanted flux of air-borne particulate contamination into the fiber forming environment. It is known that a large percentage of the fly, fuzz and dust comes from the surfaces of the apparatus and structure surrounding each fiber forming station. Without Applicants' invention, the air in the fiber forming tunnel recirculates around the forming stations, thereby entraining and recirculating the particulate found on the surfaces of the apparatus and structures. Past efforts to control the influx of this contaminated air into the fiber forming zones have centered on the use of rear prepad sprayers (in the case of wet chop processing where additional moisture in the forming area is of no concern) and the directional input of clean air to the bushing zone, for instance from HVAC ducts.

Proper operation of the fiber forming zone demands specific amounts of air flow across the fiber forming environment. An important aspect of Applicants' invention lies in the combined use of discrete enclosures around each fiber forming station in a tunnel while supplying sufficient amounts of clean air to facilitate the fiber forming operation.

The method of the present invention acts to supply the predetermined volume of clean air and isolate the air flow interactions between adjacent positions in the fiber forming operation. The volume of air supplied to the fiber forming environment of each adjacent forming station in a tunnel is dependent upon several factors including the tip plate area and the pulling speed of the winder. Typically, 450 to 750 cubic feet per minute of room temperature or cooled air is desired. Since all bushings require a clean diffuse low velocity source of air to satisfy entrainment requirements, the air is supplied from side or rear ducts proximate the bushing. The volume and velocity of air to the bushing is individually controlled for each fiber forming station. Turbulent recirculatory air flow patterns at the front or rear of the fiber forming zone can suggest an unbalance or insufficient volume of air being supplied to the bushing. In the present invention, the proper volume of air supplied to the bushing is determined to be the point at which the turbulent recirculation of the prepad mist subsides and/or the point where a slight positive pressure exists in the forming zone, relative to the pressure outside the enclosure.

The method and apparatus of the present invention will be more fully described with reference to the following drawings.

DETAILED DESCRIPTION OF THE DRAWINGS

Figure 1:
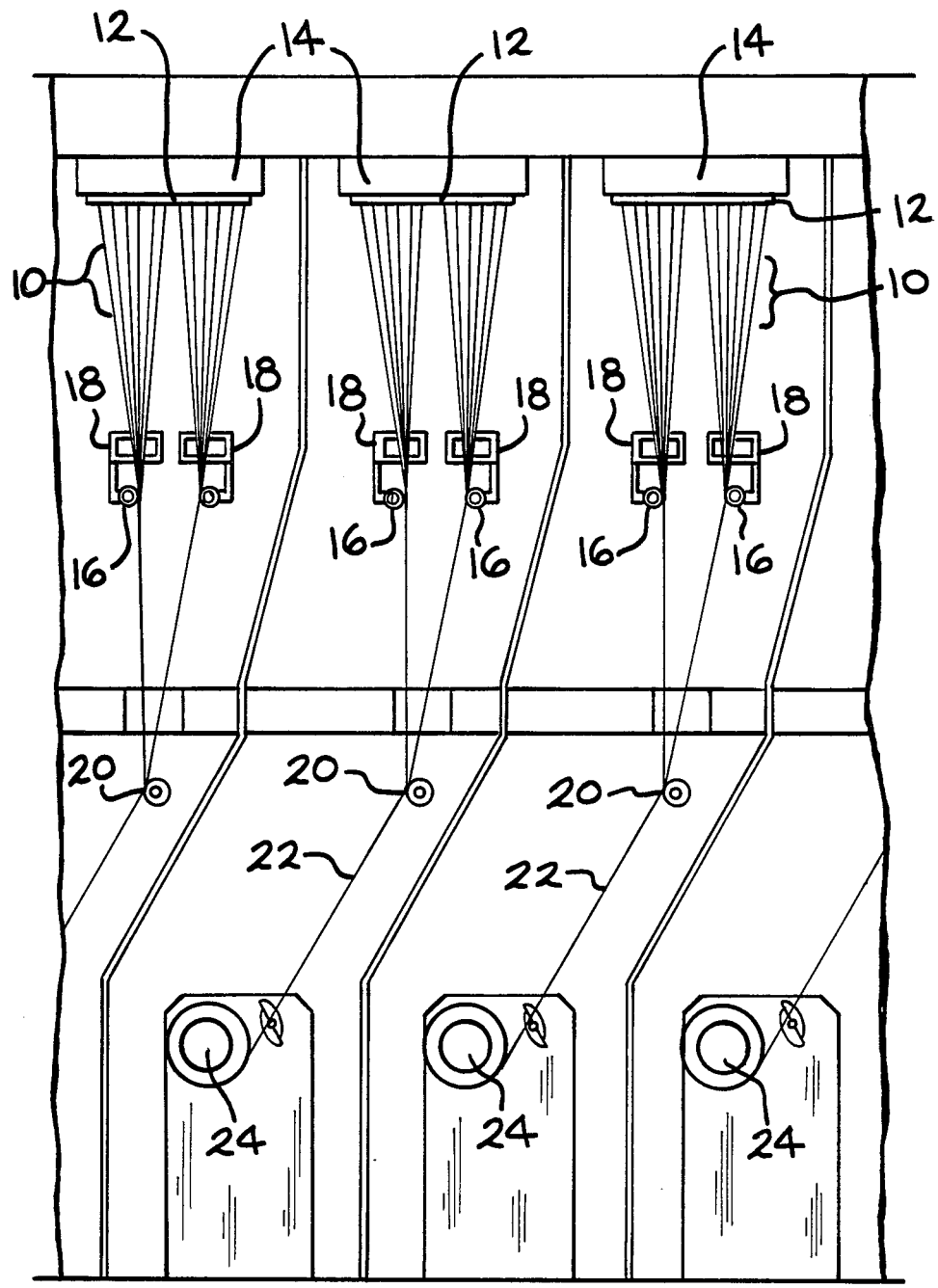
FIG. 1 is a front view schematic representation of a series of continuous strand glass fiber manufacturing stations showing the fiber forming zone.

Referring now to FIG. 1, the continuous strand glass fiber forming manufacturing process in which the method and apparatus of the present invention is intended for use is shown. While the preferred embodiment and description of the drawing of the present invention is discussed in relationship with the continuous strand process, it is to be noted that the preferred embodiment of the invention is applicable to the wet chop manufacturing process. A fiber forming tunnel contains a plurality of fiber forming stations. Each station drawns glass material from a glass melt furnace (not shown) through the tip plate 12 of a bushing 14 located at the bottom or end of the furnace. The discrete glass filaments 10 are attenuated from the tip plate 12 located at the bottom of bushing 14. The glass filaments or fibers 10 are drawn into closer proximity with one another across the face of a roller 16 positioned in an applicator housing 18. The roller 16 of the applicator 18 applies size or binder material to the filaments 10 as they pass over the roller surface. The size or binder conditions the filaments for the particular manufacturing operation. In the process embodiments of FIG. 1, the filaments 10 are split into two groups upon leaving the tip plate 12. The two groups of filaments 10 are passed through gathering shoes 20 which consolidate the filaments 10 into integral glass fiber strands 22. The strands 22 are supplied to a winder 24 which is driven by a motor (not shown) positioned in a housing 26. As shown in FIG. 1., it is common for the fiber forming apparatus to be located on three separate floors. The glass melt furnace and forehearth (not shown) are located on a top floor. The bushing 14 extends through the top floor and the applicator rollers 16, and gathering shoes 20 are located on a middle floor. The winder 24 is located on a bottom or ground floor. The fiber strands 22 extend through openings 28 in the floors between the various pieces of apparatus.

In order to facilitate the proper cooling of the molten glass as it is being drawn from the bushing tip plate 12 into glass fiber filaments 10, air is directed across the bushing 14 surface. Under normal operation procedure, a fan (not shown) is located on the bottom or ground floor to draw air from the air supply around the bushing 14 through the openings 28 in the floors. This results in air circulating in the fiber forming zone. It also results in a higher air pressure located at the top floor and lower air pressure at the bottom or ground floor. Coordination of the air flow temperature and pressure is of utmost importance in the ability to manufacture quality finished products.

Figure 2:
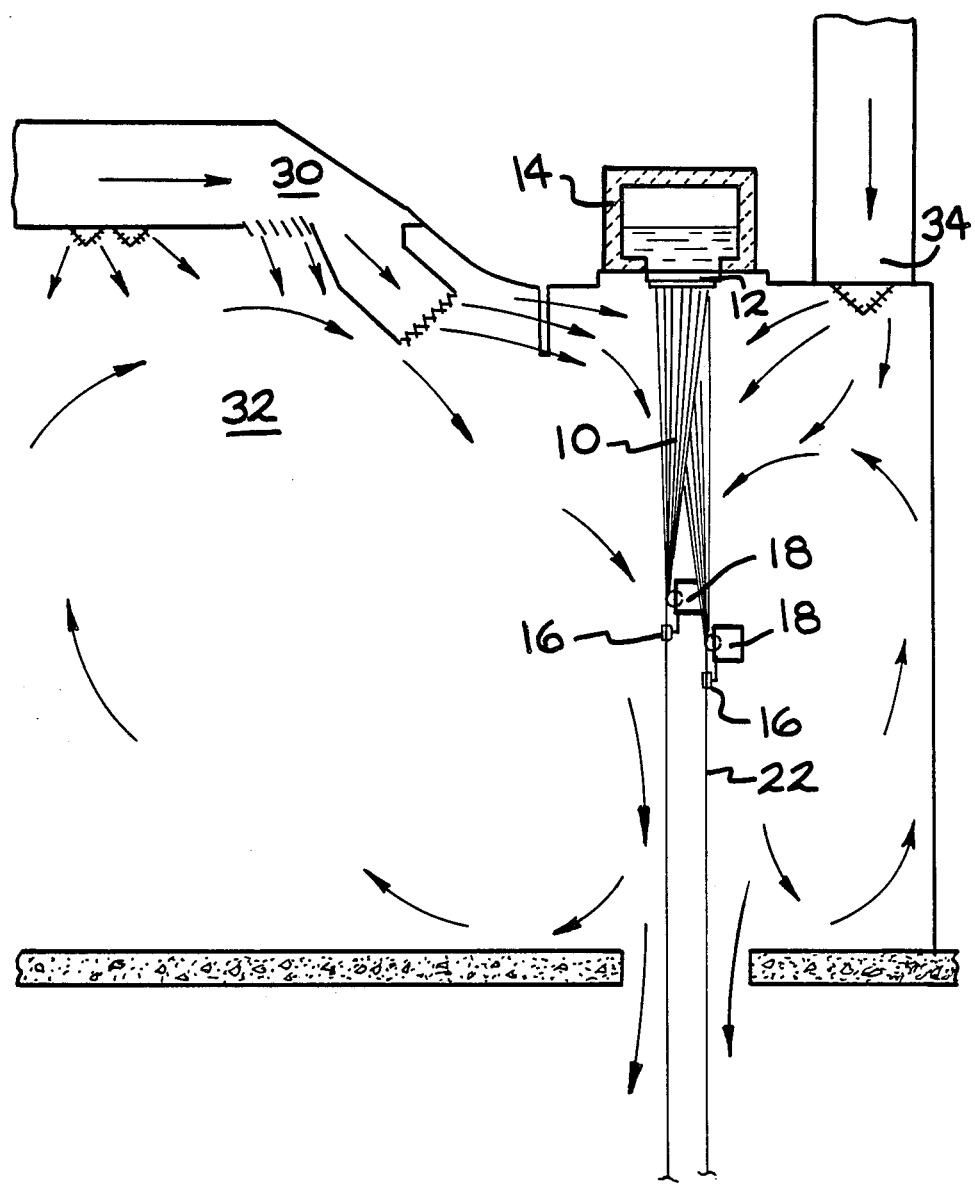
FIG. 2 is a side view schematic representation of a fiber forming zone of a continuous strand glass manufacturing process showing air flow characteristics by vector.

Referring now to FIG. 2, a typical air flow cycle diagram is shown for the fiber forming environment located in the middle floor as that shown in FIG. 1. The glass filaments 10 are drawn from the bushing 14 past the applicator roller 16 and gathering shoes 20 to form strands 22 which are run through the opening 28 in the floor to the winder 24. In the embodiment shown in FIG. 2, a first air duct 30 with a flexible air scoop 32 is positioned in front of the bushing 14 to direct air across the filaments 10 immediately below the bushing 14. A second air duct 34 is positioned behind the bushing 14 and operates to direct air downward along the filament flow to facilitate cooling of the glass. Other common fiber processing stations may not include air ducts 30, 34 and air scoop 32 or may include various combination of modifications of the embodiment shown in FIG. 2. The important design factor lies with the necessity of supplying proper air flow and volume to the bushing 14. Typically, 450 to 750 cubic feet per minute of room temperature or cooled air is required to achieve the desired glass product.

The vectors of FIG. 2 indicate the circulatory flow of the air in the fiber forming environment. A portion of the air is drawn through the opening 28 in the floor while the remainder of the air impacts the floor and recirculates upwards into the critical fiber forming zone. This recirculation of air creates the undesired flux of fly, fuzz and various other particular contaminants in the environment surrounding the fiber filaments 10. The majority of the air recirculation containing particulate contaminants occurs behind the bushing in the rear air flow pattern.

Figure 3:
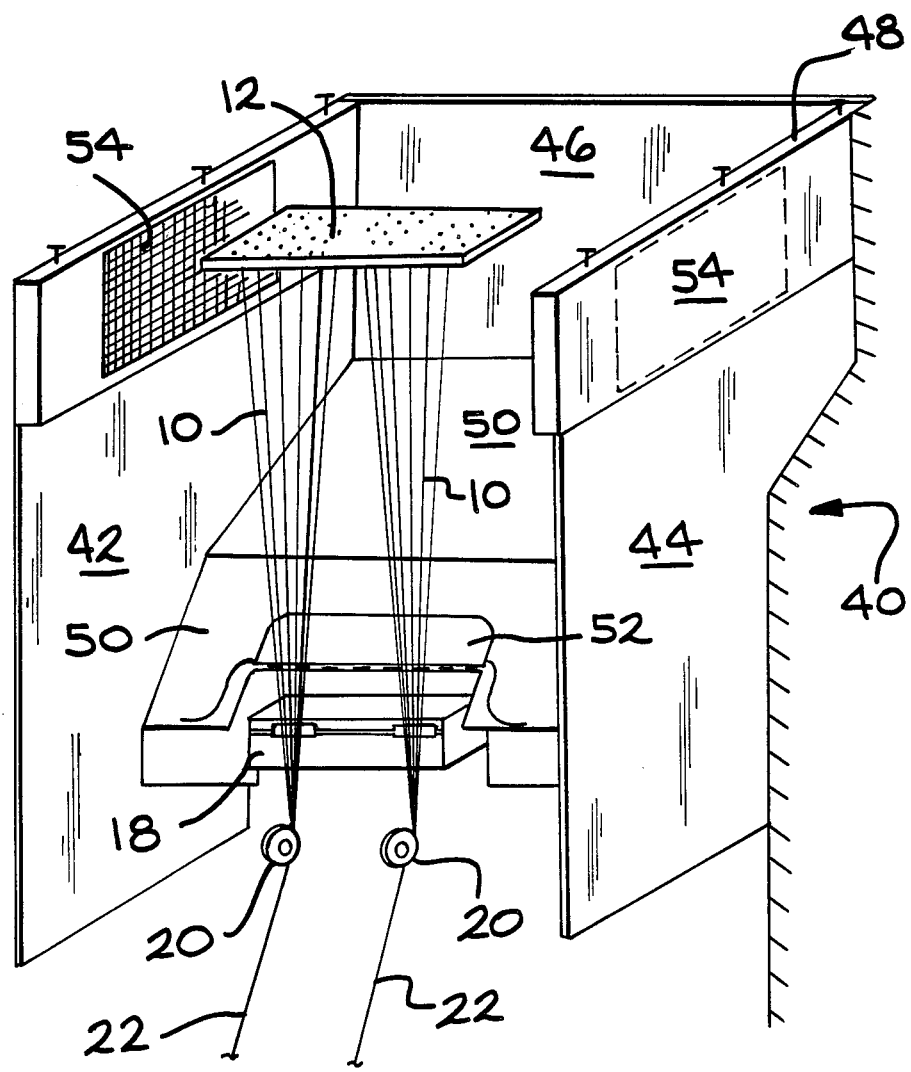
FIG. 3 is a perspective schematic view of one embodiment of the apparatus of the present invention capable of performing the methodology of the present invention.
Figure 4:
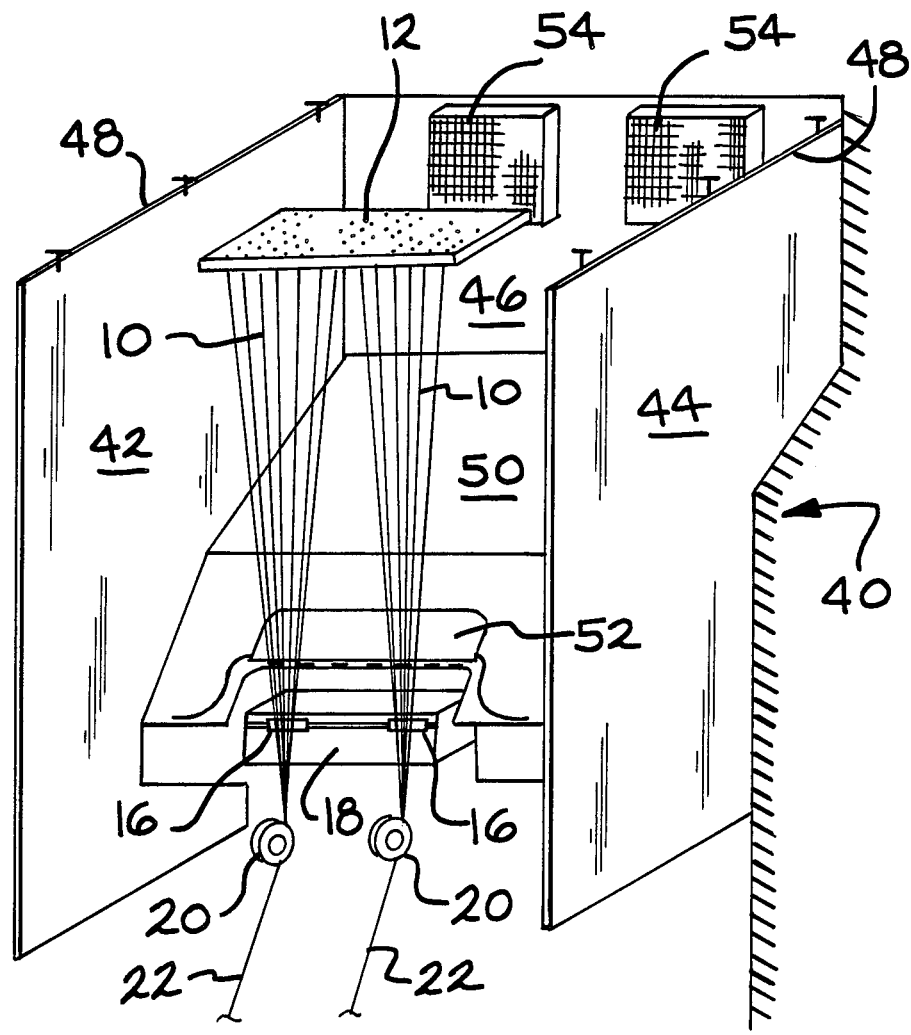
FIG. 4 is a perspective schematic view of a second embodiment of the apparatus of the present invention capable of performing the the methodology of the present invention.

Referring now to FIGS. 3 and 4, the apparatus of the present invention is shown in two different embodiments. The apparatus consists of a housing 40 having two opposed side walls 42, 44. A back wall 46 is interposed between the two side walls 42, 44. The top portions of the side walls 42, 44 and back wall 46 are interconnected with the bottom 48 of the bushing 14 so that the side walls 42, 44 and back wall 46 are spaced around the bushing tip plate 12. The side walls 42, 44 extend from the bottom 48 of the bushing 14 to a point approximately twelve inches below and in front of the applicator 18. An angular middle wall 50 extends between the two side walls 42, 44 downward from the bottom of the back wall 46 in a plane approximately parallel with the plane of the bead shield 52 (see FIG. 3). In the preferred embodiment, all the wall sections are removably interconnected to facilitate cleaning and bushing changes. Air ducts 54 are located either on the side walls 42, 44 (FIG. 4), the back wall 46 (FIG. 5), or a combination of both. The air ducts 54 supply the predesired amounts of air to the bushing at predetermined temperatures and the exact location and size of the air ducts 54 is dependent upon the design of the fiber forming environment which is intended to be controlled. The air ducting 54 design must be sufficient to provide the 450 to 750 cubic feet per minute of air as required by regular entrainment processes.

The proper volume of air to be supplied to a specific bushing is characteristically determined to be the point at which the turbulent recirculation of any prepad mist subsides or the point at which a slight positive pressure exists in the forming zone relative to the pressure outside the enclosure. To achieve this condition, flow visualization using smoked tubes is used to map the flow of air inside and surrounding the enclosed position. Recirculation flow patterns at the front or rear of the bushing will suggest an imbalance or insufficient volume of air being supplied to the bushing. Also, any flow of smoke into the enclosure suggests insufficient air pressure within the enclosure. If there is no flow of smoke into the enclosure, the enclosure is slightly pressurized with respect to the outside environment. Thus, the air supply can be fine tuned to the needs of each particular fiber forming zone and the fiber forming environment between the bushing tip plate and the shoes can be effectively isolated from the contaminated air and the recirculating particulates as shown by diagram in FIGS. 2 and 3.

Figure 5:
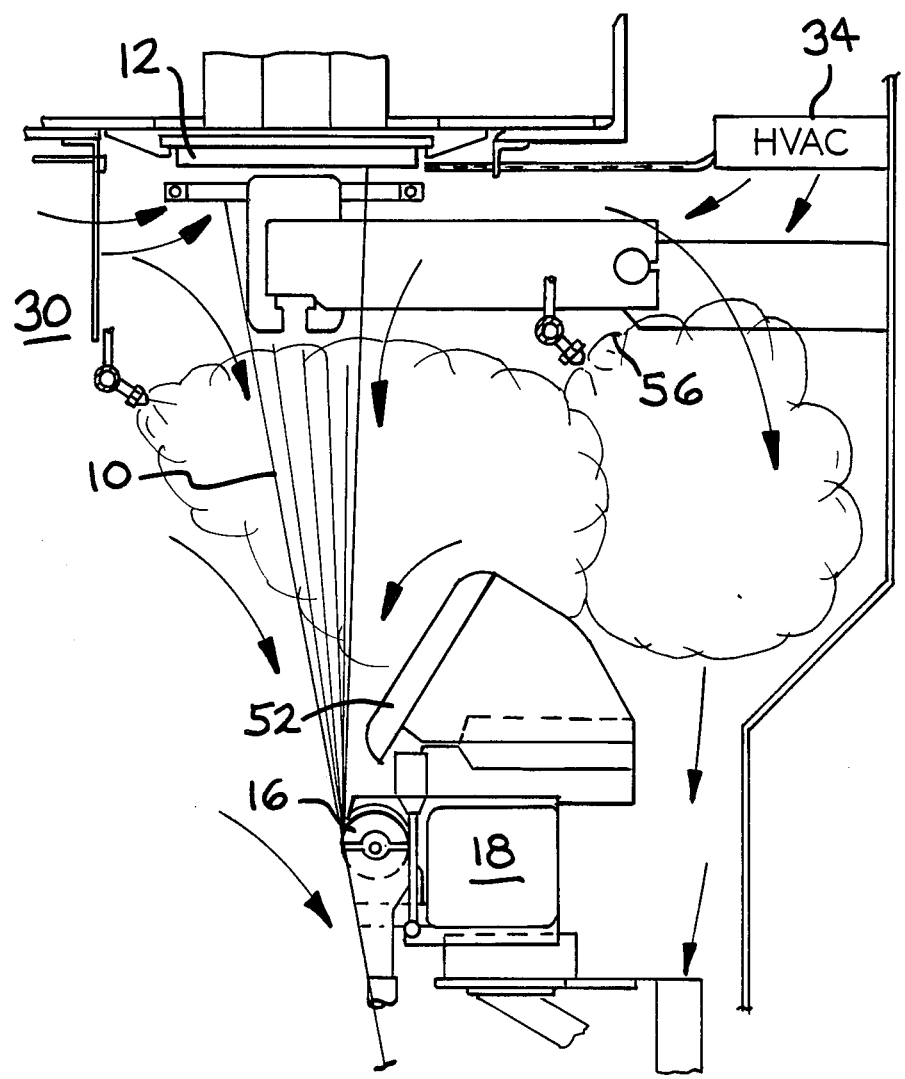
FIG. 5 is a side view schematic representation of a wet chop glass manufacturing process having the rear prepad spray embodiment of the present invention in use and showing air flow characteristics by vector.

Referring now to FIG. 5, an alternative embodiment of the present invention is shown which may also be used in the wet chop process. The angularly disposed middle plate 50 is removed from the enclosure and rear prepads 56 are positioned to direct spray in such a manner as to intercept the upward movement of air through the space created by the removed middle plate 50. The rear prepad 56 sprays eliminate the upward movement of air, thus preventing any particulate contaminant from reaching the fiber forming zone. The rear prepads 56 spray of course, may only be utilized in co-operation with the wet chop process where the additional moisture in the forming area from the prepads is not critical. Since the rear prepads 56 are directed away from the fibers 10, the strand moisture does not increase. Any excess water exits through the floor openings to the lower level without affecting the finished product.

Thus, the rear prepads 56 may only be utilized with the wet chops process. If utilized with the dray continuous strand processes, the excess moisture will drip onto the finished product in the winder 24 located on the ground floor.

The above description of the drawings is intended to be educational in scope and not intended to be limiting on the scope and content of the claim which follows.

We claim:

1. An apparatus for the production of glass fiber comprising in combination:
   a bushing member for receiving molten glass from a glass melt furnace, said bushing member having a plurality of discharge orifices for providing a plurality of streams of molten glass for attenuation into filaments;
   a forming means for conditioning and attenuating such filaments;
   a winding means for processing such attenuated filaments;
   a housing member engaged with said bushing member, said housing member including side wall members positioned on opposed sides of said discharge orifices and a back wall positioned between said side wall members, wherein said side wall members extend from said bushing to a point just below said forming means and said back wall extends from said bushing generally angularly toward said forming means ending at a location closely proximate said forming means without engaging such attenuating filaments, whereby said side walls and said back wall seal off the fiber attenuation area between said bushing and said forming means to prevent the introduction of air and particulate from anywhere outside said housing into said fiber attenuation area; and
   air ducts within said housing member for supplying clean air across such attenuating filaments in said fiber attenuation area.

2. The apparatus of claim 1, wherein the sole source of air to such attenuating filaments within said housing member are said air ducts.

3. The apparatus of claim 1, wherein said air ducts are positioned on said side walls of said housing member.

4. The apparatus of claim 1, wherein said air ducts are positioned on such vertical portion of said back wall of said housing member.

5. An apparatus for the production of glass fiber, comprising in combination;
   a bushing member having an orificed discharge member for providing streams of molten glass for attenuation into filaments;
   an applicator member for applying sizing or binder to said attenuating filaments;
   a process apparatus for receiving such attenuating glass filament and processing such filaments into usable end products;
   a housing member positioned around said bushing member, said housing member having opposed side walls engaged, with said bushing member, said side walls extending vertically from said member to a point immediately below said applicator member;
   a back wall member vertically disposed and extending between said side wall members and also engaged with said bushing member, such vertical portion of said back wall member ending at a point approximately halfway between said bushing member and said applicator member;

an angularly disposed wall member extending between said side wall members joined to said back wall member and extending from said back wall member toward said applicator member, wherein said side walls, back wall member and angularly disposed wall member seal off the fiber attenuation area between said bushing member and said applicator member to prevent the introduction of air and praticulate from anywhere outside said housing member into said fiber attenuation area; and air supply means within said housing member for supplying clean air to said bushing member and such filaments.

6. The apparatus of claim 5, wherein the air supply means is positioned on said opposed side walls of said housing members.

7. The apparatus of claim 5, wherein said air supply means is positioned on said vertical portion of said back wall of said housing member.

8. An apparatus for the production of glass fiber comprising, in combination:

a bushing member having an orificed discharge member for providing streams of molten glass for attenuation into filaments;

an applicator member for applying sizing and binder to said attenuating glass filaments;

a processing apparatus for receiving such attenuating glass filament and processing such filament into usable end products;

a housing member positioned around said bushing members, said housing member having opposed side walls engaged with said bushing member and spaced from said orificed discharge member, said side walls extending vertically from said bushing member to a point immediately below said applicator member;

a back wall member vertically opposed and extending between said side wall members and also engaged with said bushing member;

air supply means for supplying clean air to said bushing member and such filaments; and a rear prepad spray means for scrubbing any air flowing into said housing member along said back wall member.

9. An method for the production of glass fiber comprising the steps of:

providing molten glass to a bushing having a orificed discharge plate adapted to provide streams of molten glass for attenuation into filaments;

gathering such attenuating filaments and applying sizing or binder to such filaments at an applicator roller;

enclosing such attenuating filaments between said bushing and such applicator roller with a housing and sealing the attenuation area between such bushing and such applicator to prevent the influx of any air or particulate from outside such housing into such attenuation area; and supplying clean air to such bushing and attenuating filaments within such housing, said clean air being the sole air supplied within such housing.

10. The method of claim 9, further including the step of measuring the air flow from such clean air supply within such housing to insure proper circulation dynamics between such bushing and such applicator to prevent intrusion of unclean air from the environment exterior to such housing.

* * * * *